United States Patent [19]

Brennan

[11] Patent Number: 4,738,390

[45] Date of Patent: Apr. 19, 1988

[54] MAGNETIC CLOSURE DEVICE FOR ENVELOPE OR THE LIKE

[76] Inventor: Gerald P. Brennan, 838 S. Michigan Blvd., Pasadena, Calif. 91107

[21] Appl. No.: 826,146

[22] Filed: Feb. 3, 1986

[51] Int. Cl.$^4$ ....................... B65D 27/06; B65D 27/14
[52] U.S. Cl. ........................................ 229/77; 206/818
[58] Field of Search ............... 229/77, 78 A; 206/818; 428/900

[56] References Cited

U.S. PATENT DOCUMENTS

| | | | |
|---|---|---|---|
| 2,959,832 | 11/1960 | Baermann | 428/900 |
| 3,078,183 | 2/1963 | Karalus | 206/818 |
| 3,111,735 | 11/1963 | Ellis | 428/900 |
| 3,325,084 | 6/1967 | Ausnit | 229/77 |
| 3,326,399 | 6/1967 | Ausnit | 428/900 |
| 3,749,301 | 7/1973 | Peckar | 428/900 |
| 4,033,013 | 7/1977 | Peterson | 428/900 |
| 4,249,267 | 2/1981 | Voss | 428/900 |

Primary Examiner—Stephen P. Garbe
Attorney, Agent, or Firm—William T. O'Neil

[57] ABSTRACT

A repetitively reusable envelope closure arrangement including a pair of thin magnetic plastic patches attached by a cementing agent to at least one portion of the foldable flap of the envelope and to at least one corresponding portion of the envelope body in contact therewith such that the flap is magnetically secured in a closure position. In an alternative embodiment, finely powdered magnetic material having a high order of magnetic retentivity is magnetized in the fluid medium of a standard gum and applied to at least one of the aforementioned envelope flap and body portions and a similar mixture of low retentivity magnetic material particles in gum is applied to the corresponding mating flap or body portion to effect a magnetically secured closure.

3 Claims, 1 Drawing Sheet

MAGNETIC CLOSURE DEVICE FOR ENVELOPE OR THE LIKE

BACKGROUND OF THE INVENTION

The invention relates generally to paper envelope (or similar package) closure means, and more particularly to such closure means in reusable form.

A very large number of paper envelopes are used each day in the conveyance of written and printed materials and the like from place-to-place through the world's postal service and otherwise. Many of these are sealed by a gum or cementing agent and are not intended to be reusable once they have been opened at their destinations, however, reusable envelopes in large numbers are in such daily uses as "inter-office" envelopes in the familiar office environment. It is in connection with that and other reusable envelope and package applications that the invention is of most interest and value.

In the prior art, various closure expedients are known. Among the prior art closures there are a number of reusable envelope closures such as the "string and buttons" type; the clasp on an envelope body bent flat after penetrating an opening in the envelope flap; and, more recently, Velcro (a trade name) patches on the envelope body and flap. Each of these prior art devices generally serves the general purpose of reusable envelope closure, but each presents its own disadvantage.

In a medium or large scale office operation, time is a factor to be considered. The "string and button" closure device is relatively inexpensive and provides a large number of reuse cycles but the opening and closing operations are relatively slow. The bendable clasp may afford somewhat faster opening and closing but fewer reuse cycles before breaking or excessive deformation of the clasp occurs.

In an apparent attempt to reduce opening and closing times, the Velcro patch device has been offered. A relatively large number of opening and closing cycles are provided, however, the Velcro patch device tends to make the envelope quite thick at its location, this causing a space problem as new envelopes are packed for shipment. That is, fewer envelopes can be stacked in a given package than for envelopes of the string and buttons or deformable metal clasp types. Although the mating Velcro patches provide rapid opening and closing, they are relatively expensive.

The manner in which the invention improves upon the prior art to provide a novel and highly advantageous reuse closure for an envelope or similar package.

SUMMARY OF THE INVENTION

In view of the disadvantages of prior art reuse envelope closure devices, and in view of the highly competitive state of this art, it may be said to have been the general object of the invention to provide an envelope closure device which is low in cost, easily manufactured and attached to an envelope using existing envelope manufacturing techniques, adapted to unlimited reuse and which requires minimal user handling time.

A first embodiment according to the invention uses at lease one patch or strip of magnetic tape on the envelope flap and on a matching location on the envelope body so that closure of the envelope flap results in a magnetic engagement. The magnetic patches or strips can be cut from a flexible plastic or rubber tape having a coating or layer of magnetic material on one side and a cementing agent on the other side (in contact with the surface of the envelope). The magnetic layers on the envelope flap and body are thus placed in close contact when the flap is pressed closed. Such magnetic tapes are available commercially and have a net thickness of only a few mils.

A second embodiment according to the invention involves the mixing of finely powdered magnetic material in gum conventionally applied to the envelope flap and matching body area. The gum need not be of the type which activates as a cementing agent when subsequently wetted. At least one of the flap or envelope body areas upon which this gum mixture is deposited is subjected to a magnetic field immediately after its deposition such that permanent magnetism is imparted to its magnetic particles. Only the area: (flap or envelope body) selected for magnetization need contain high magnetic retentivity particles, the matching area requires only low retentivity particles.

The details of the aforementioned embodiments are presented hereinafter in a form readily understandable to those of skill in this art.

DETAILED DESCRIPTION

Figure 1:
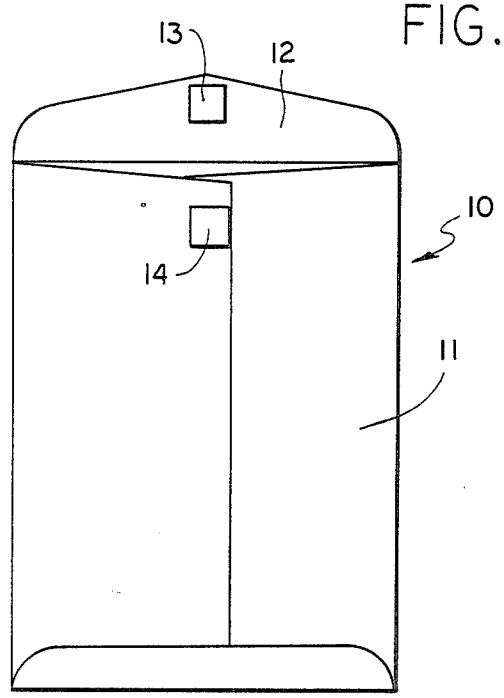
FIG. 1 illustrates a typical "inter-office" envelope with magnetic tape closure patches according to the invention.

Referring now to FIG. 1, a large envelope of the familiar "inter-office" type is shown generally at 10, and will be seen to have a body portion 11 and flap 12. When the flap 12 is folded over body 11, the magnetic patches 13 and 14 come into flat contact with each other forming a magnetic grip effecting closure of the envelope. The magnetic patches 13 and 14 are automatically placed during envelope manufacture by conventional apparatus well known in this art, and adhere to the envelope flap and body respectively, by virtue of a layer of a cementing agent. That cementing agent can be of the non-drying type not requiring wetting or setting time and may be pre coated onto the magnetic tape. That is, it adheres to the paper surface of the envelope immediately upon placement.

The magnetic patches 13 and 14 are preferably cut from a roll of rubber (or other polymer) tape onto which a surface of magnetic material has been applied. Such magnetic tape is commercially available from any of a number of sources as it is commonly used in the printing industry in relatively large sheets formed over a printing drum to hold curved printing plates in place. One supplier of such a tape is the Anderson-Vreeland Co. The tape can be obtained with an adhesive backing (on the surface opposite the magnetic layer) or can be obtained without adhesive. In that alternative form, the tape can be cut from a double layer (magnetic surfaces in contact) of tape gummed on both open sides during envelope manufacture, much as the gum is deposited on the flap of a conventional envelope not intended for reuse. The envelope flap 12 is then folded over body 11 and the gum or cementing agent adheres to both flap 12 and envelope body 11 while the magnetic patches are in substantially perfect alignment (registration). Opening of envelope flap 12 after the aforementioned process step leaves the patches 13 and 14 cemented in place and substantially perfectly aligned during repeated subsequent envelope closures. The magnetic tape suggested does not require rotational orientation in a plane parallel to the plane of the paper.

Figure 2:
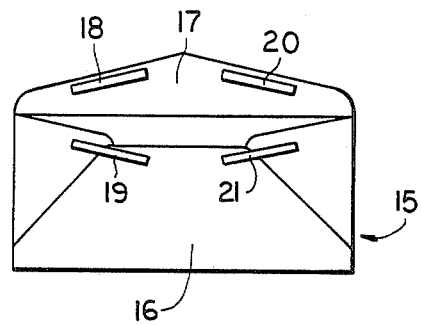
FIG. 2 illustrates a second envelope form in which plural elongated magnetic tape patches are employed.

In FIG. 2, another envelope form generally at 15 has a body 16 and a flap 17 and may be the size of a conventional business letter envelope. Pairs of somewhat elongated patches (strips) 18-20 and 19-21 are affixed to the envelope flap 17 and body 16 respectively such that 18 comes into flat contact with 19 when the flap 17 is folded over body 16 and 20 interface against 21 similarly.

It will be realized that the effectiveness with which envelope closure is maintained is proportional to the areas of magnetic surfaces in contact. It will further be realized that, while the square or rectangular shapes of the magnetic patches of the FIGS. 1 and 2 envelopes is convenient (readily cut from a tape of appropriate width) circular or other magnetic patch shapes are not precluded.

Figure 3:
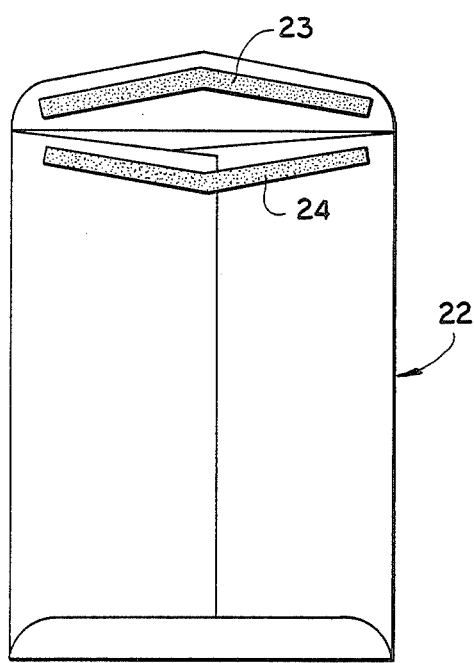
FIG. 3 depicts an envelope of the FIG. 1 type except with gum and magnetic powder strips according to an alternative embodiment of the invention.

In FIG. 3, an envelope 22 of the FIG. 1 type is shown, except that the magnetic effect is obtained by finely powdered magnetic material (ferrous for example) mixed with a quick drying gum applied by precisely the same processes employed in the manufacture of gummed flap envelopes not intended for reuse. Either the gummed area 23 or 24 employs a high magnetic retentivity powdered material which is "grain oriented" to exhibit a permanent magnet characteristic while the other may contain unmagnetized particles of high magnetic permeability and low retentivity. The same description of the powdered magnetic material gum mixture applies to the envelope 25 of FIG. 4, the envelope 25 being of comparable configuration to that of FIG. 2.

Figure 5:
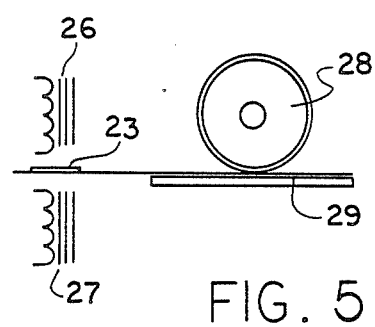
FIG. 5 schematically depicts a possible magnetizing arrangement for magnetically activating closure strips of FIGS. 3 and 4.

The aforementioned powdered magnetic material gum may be activated by means of energizing magnets (illustrated as electromagnets) 26 and 27 in FIG. 5. The showing of FIG. 5 is essentially schematic, merely to convey the concept. The actual arrangement for magnetization would necessarily be coordinated with the particular machinery employed in envelope manufacture. The necessary adaptations would be readily implemented by a person of skill in that art once the concept is understood herefrom. A roller and pressure plate 29 would be found in most machinery for the purpose when the envelope receives the magnetic gum placed on a roll of paper before or after die cutting, shearing and folding. It should be emphasized that the closure device according to the invention is adapted for "in line," mill, or separate application whereas "string and buttons," clasp or other prior art devices can only be separately emplaced.

Figure 4:
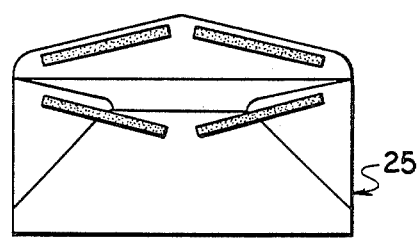
FIG. 4 is an envelope of the FIG. 2 type except with gum and magnetic powder strips as in FIG. 3.

The second embodiment contemplated by FIGS. 3 and 4 has the advantage that it is well adaptable to manufacture by conventional, high-production envelope making machinery. On the other hand, the magnetic tape patch embodiment illustrated in FIGS. 1 and 2 can be manufactured by those conventional machines and techniques except for deposition of the patches themselves. Machinery and techniques for placing the prior art Velcro patches (hereinbefore referred to) can readily provide for deposition of the magnetic patches contemplated in FIGS. 1 and 2. The necessary adptation can readily be accomplished by a person of skill in the envelope manufacturing art.

It will be evident to the skilled practitioner in this art that envelopes having metallic (ferrous) members in their closure devices, such as, for example, the well-known clasps used in some envelopes, can be fitted with a single magnetically matching (on the envelope flap for example) patch according to the invention to form a hybrid closure device enjoying some of the advantages of the invention.

The embodiments of FIGS. 1 and 2 and FIGS. 3 and 4 both provide a substantially unlimited number of opening/closing (reuse) cycles. Moreover, both are readily and inexpensively manufactured and both provide a flat "lay" when packaged and when handled. Obviously too, only minimum effort and time are required for opening and closing—a consideration of importance in "envelope stuffing" operations.

The term "magnetic patch" is used generically and is intended to refer to both embodiments described herein. The term polymer is intended to embrace rubber and flexible plastic materials.

Modifications and variations within the spirit of the invention will suggest themselves to the skilled person, once the invention is understood. Accordingly, it is not intended that the invention should be regarded as limited by the specifics of the drawings or this description, these being intended as typical and illustrative only.

I claim:

1. A reusable paper stock envelope having a body portion and a flap foldable over said body poriton to effect closure of the interior of said envelope, comprising:
   a first magnetic patch set including at least one magnetic patch affixed to the underside of said flap facing said body portion when said flap is folded into said closure position;
   a second magnetic patch set including at least one magnetic patch affixed to said envelope body portion at a location such as to be overlapped in substantially planar contact with a corresponding magnetic patch of said first set when said flap is folded into said closure position, said magnetic patches of said first and second sets being thin strips of flexible, non-metallic magnetic tape;
   and adhesive means for affixing said magnetic tape strips to said flap and envelope body.

2. The combination according to claim 1 in which said first and second magnetic patch sets each comprise plural strips of said magnetic tape, said strips of said first set each overlapping a corresponding one of said strips of said second set in planar contact when said flap is folded into said closure position.

3. The combination according to claim 2 in which each magnetic strip of one of said sets comprises a strip of permanently magnetized tape and the corresponding strip of the other set comprises non-retentive but relatively high permeability magnetic material.

* * * * *